(12) United States Patent
Tokashiki et al.

(10) Patent No.: US 8,299,897 B2
(45) Date of Patent: Oct. 30, 2012

(54) INFORMATION PROCESSING APPARATUS, METHOD, AND PROGRAM

(75) Inventors: Mamoru Tokashiki, Tokyo (JP); Hideo Nagasaka, Kanagawa (JP); Shigeharu Kondo, Kanagawa (JP)

(73) Assignee: Sony Corporation (JP)

( * ) Notice: Subject to any disclaimer, the term of this patent is extended or adjusted under 35 U.S.C. 154(b) by 953 days.

(21) Appl. No.: 12/321,608

(22) Filed: Jan. 22, 2009

(65) Prior Publication Data

US 2009/0212923 A1    Aug. 27, 2009

(30) Foreign Application Priority Data

Jan. 24, 2008 (JP) ................ P2008-013863

(51) Int. Cl.
G08B 5/22 (2006.01)
G08B 25/00 (2006.01)
H04Q 1/30 (2006.01)

(52) U.S. Cl. ...... 340/7.24; 340/7.33; 340/8.1; 340/7.48; 715/752

(58) Field of Classification Search ............ 340/7.24, 340/7.33, 8.1, 7.48; 455/556.1, 556.2, 346, 455/406; 705/40; 709/206; 715/752
See application file for complete search history.

(56) References Cited

U.S. PATENT DOCUMENTS

| | | | | |
|---|---|---|---|---|
| 4,695,975 A | * | 9/1987 | Bedrij | 715/202 |
| 5,684,999 A | * | 11/1997 | Okamoto | 704/9 |
| 6,885,877 B1 | * | 4/2005 | Ozaki et al. | 455/556.1 |
| 7,308,479 B2 | * | 12/2007 | Ando et al. | 709/206 |
| 7,386,332 B2 | * | 6/2008 | Masuda et al. | 455/575.4 |
| 8,086,679 B2 | * | 12/2011 | Nobori et al. | 709/206 |
| 2001/0020247 A1 | * | 9/2001 | Ikeda et al. | 709/206 |
| 2007/0206101 A1 | | 9/2007 | Ueno et al. | |

FOREIGN PATENT DOCUMENTS

| | | |
|---|---|---|
| JP | 2005-275985 A | 10/2005 |
| JP | 2005-277462 A | 10/2005 |
| JP | 2006-099194 A | 4/2006 |
| JP | 2006-317872 A | 11/2006 |
| JP | 2007-151057 A | 6/2007 |
| JP | 2007-213385 A | 8/2007 |
| JP | 2007-264763 A | 10/2007 |
| WO | 2007-069361 A1 | 6/2007 |

* cited by examiner

*Primary Examiner* — Nam V Nguyen

(74) *Attorney, Agent, or Firm* — Lerner, David, Littenberg, Krumholz & Mentlik, LLP

(57) ABSTRACT

An information processing apparatus includes an identification information acquisition unit configured to acquire identification information that is contained in a tag whose registration has been instructed by a user and that identifies the tag from among a plurality of tags indicating user feelings; a registration information generation unit configured to acquire information corresponding to a user feeling indicated by the tag whose registration has been instructed by the user and to generate registration information including the information corresponding to the user feeling added in association with the identification information; and a display unit configured to display a list of images of tags corresponding to identification information contained in the registration information and display information corresponding to a user feeling added in association with identification information corresponding to a tag selected from the list of the images of the tags, on the basis of the generated registration information.

9 Claims, 16 Drawing Sheets

FIG. 5

| TAG ID | NAME | ICON IMAGE DATA | COLOR DATA |
|---|---|---|---|

FIG. 6

| TAG ID | 001 | 002 | 003 | 004 | 005 | 006 | 007 | 008 | 009 |
|---|---|---|---|---|---|---|---|---|---|
| NAME | SMILING | DELICIOUS | ANGRY | SURPRISED | COMFORTABLE | FASCINATED | DISGUSTED | CRYING | COOL |
| ICON IMAGE DATA | ◉ | ◉ | ◉ | ◉ | ◉ | ◉ | ◉ | ◉ | ◉ |
| COLOR DATA | YELLOW | ORANGE | RED | GREEN | BLUE | PINK | BLACK | BLUISH PURPLE | REDDISH PURPLE |

FIG. 8

| TAG ID | USER ID | TIME INFORMATION | COMMENT INFORMATION | POSITIONAL INFORMATION | CONTENT INFORMATION |

FIG. 10

| TAG ID | USER ID | TIME INFORMATION | COMMENT INFORMATION | POSITIONAL INFORMATION | CONTENT STORAGE POSITION INFORMATION | THE NUMBER OF ACCESSES | TAG ID | USER ID | TIME INFORMATION | ... |
|---|---|---|---|---|---|---|---|---|---|---|

RESPONSE TAG INFORMATION spans: TAG ID, USER ID, TIME INFORMATION, ...

FIG. 13

|  | FeelTag | Image |
|---|---|---|
| 08/31/2007 09:18:05 | ☺ | 20070831091805.jpg |
| 08/31/2007 10:29:57 | ☺ | 20070831102957.jpg |
| 08/31/2007 10:31:22 | ☺ | 20070831103122.jpg |
| 08/31/2007 10:32:54 | ☻ | 20070831103254.jpg |

Done.  🌐 Internet

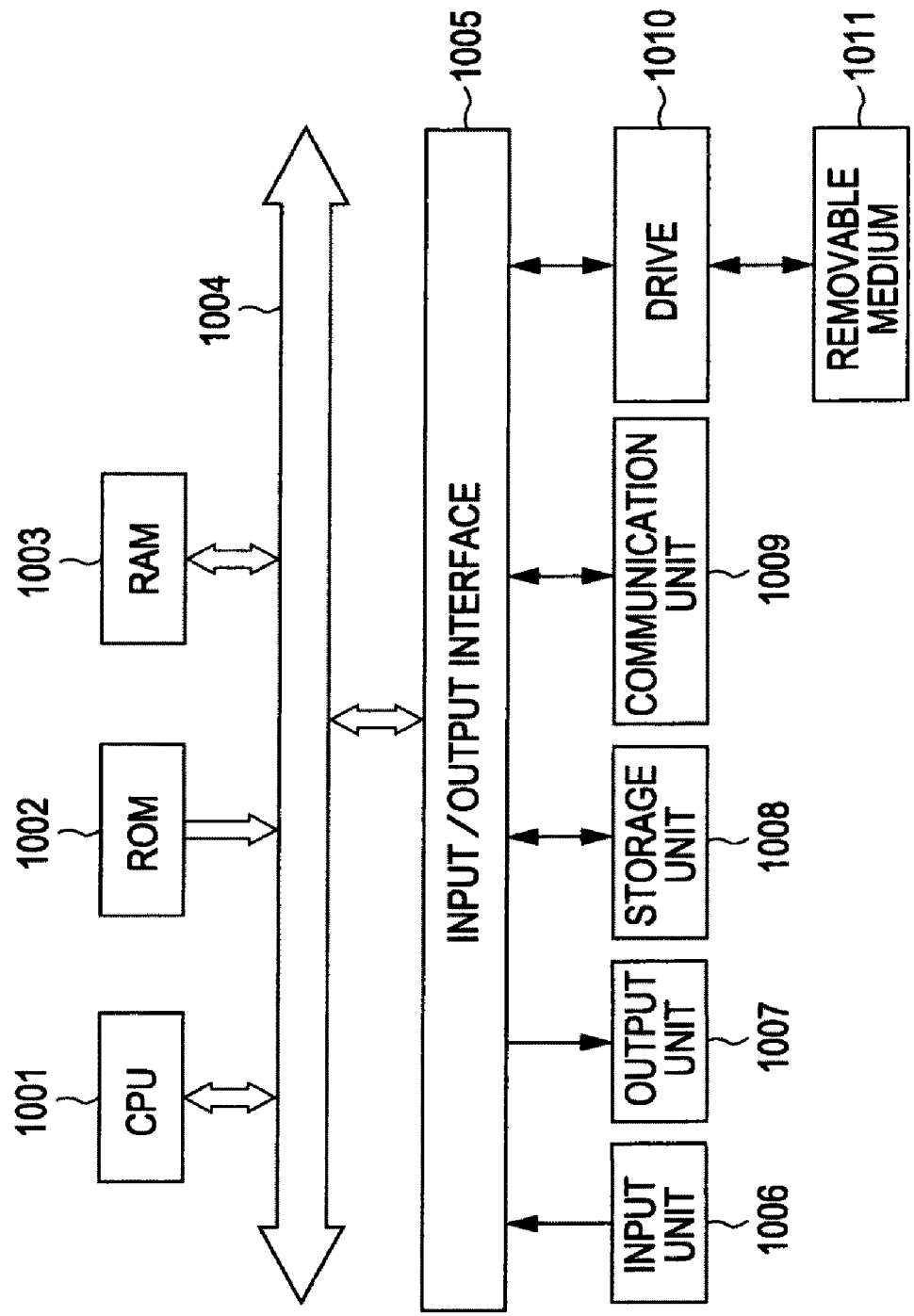

INFORMATION PROCESSING APPARATUS, METHOD, AND PROGRAM

CROSS REFERENCES TO RELATED APPLICATIONS

The present application claims priority from Japanese Patent Application No. JP 2008-013863, filed in the Japanese Patent Office on Jan. 24, 2008, the entire content of which is incorporated herein by reference.

BACKGROUND OF THE INVENTION

1. Field of the Invention

The present invention relates to an information processing apparatus, method, and program, and more particularly, to an information processing apparatus, method, and program that are capable of easily recording information related to user feelings arising from experiences and practices of users and allowing the recorded information to be rapidly understood.

2. Description of the Related Art

In recent years, technology for maintaining daily records or releasing the daily records to the public by keeping records like diaries as so-called blogs (weblogs), which contain information on familiar experiences and practices, has become popular.

In the case of maintaining daily records and releasing the daily records to the public by a blog or the like, in general, entering of text, tracing of positional information, or capturing of pictures (image information) is performed and the maintained daily records are released to the public.

Techniques for managing such positional information and image information as metadata have been suggested, for example, in Japanese Unexamined Patent Application Publication Nos. 2007-213385 and 2007-264763.

SUMMARY OF THE INVENTION

However, in the case of keeping daily records while exploiting entering of text, tracing of positional information, capturing of pictures (image information), and the like, there are some problems. For example, regarding entering of text, since it takes a certain amount of time to enter text, the real-time property of information to be recorded is degraded. In addition, regarding tracing of positional information, by recording all the positional information, redundant data containing a large amount of unnecessary information may be obtained. Furthermore, in the case of managing the daily records by using images of captured pictures, which often involve external factors, since the feeling of a user at a certain time is not recorded, obtaining a sufficient record may be difficult.

In addition, although e-mails, blogs, social networking services (SNSs), photograph sharing, and the like are available as communication procedures, it takes time and effort to create content to be recorded. In addition, there is a problem of management of private information including detailed text descriptions (for example, decision about to whom the information can be released). Furthermore, since generally only the latest information can be accessed, excellent browsability and ease of obtaining a broad overview are not necessarily achieved.

It is desirable that, by easily recording information related to user feelings arising from experiences and practices of users and allowing the recorded information to be rapidly understood, such information related to user feelings be easily shared among a plurality of users in a real-time manner and be easily released to the public.

According to an embodiment of the present invention, there is provided an information processing apparatus including identification information acquisition means for acquiring identification information that is contained in a tag whose registration has been instructed by a user and that identifies the tag from among a plurality of tags indicating user feelings; registration information generation means for acquiring information corresponding to a user feeling indicated by the tag whose registration has been instructed by the user and for generating registration information including the information corresponding to the user feeling added in association with the identification information; and display means for displaying a list of images of tags corresponding to identification information contained in the registration information and displaying information corresponding to a user feeling added in association with identification information corresponding to a tag selected from the list of the images of the tags, on the basis of the registration information generated by the registration information generation means.

The information corresponding to the user feeling may be a uniform resource identifier in which corresponding information is stored.

The information processing apparatus may further include image capturing means for capturing an image. The registration information generation means may acquire the image captured by the image capturing means as the information corresponding to the user feeling indicated by the tag whose registration has been instructed by the user, and may generate registration information including the information corresponding to the user feeling added in association with the identification information.

The information processing apparatus may further include positional information acquisition means for acquiring positional information. The registration information generation means may acquire the positional information acquired by the positional information acquisition means as the information corresponding to the user feeling indicated by the tag whose registration has been instructed by the user, and may generate registration information including the information corresponding to the user feeling added in association with the identification information.

The information processing apparatus may further include input means for entering text information. The registration information generation means may acquire the text information entered by the input means as the information corresponding to the user feeling indicated by the tag whose registration has been instructed by the user, and may generate registration information including the information corresponding to the user feeling added in association with the identification information.

The information processing apparatus may further include transmission means for transmitting information to an external apparatus; reception means for receiving the information from the external apparatus; and selection means for selecting a tag from the list of the images of the tags. The transmission means may transmit the registration information to the external apparatus. The reception means may receive, from the external apparatus, the list of the images of the tags corresponding to the identification information contained in the registration information, on the basis of the registration information. The transmission means may request the external apparatus to supply the information corresponding to the user feeling added in association with the identification information corresponding to the tag selected by the selection means. The reception means may receive the information corresponding to the user feeling transmitted from the external apparatus in response to the request. The display means may display the information corresponding to the user feeling received by the reception means.

According to another embodiment of the present invention, there is provided an information processing method including the steps of acquiring identification information that is contained in a tag whose registration has been instructed by a user and that identifies the tag from among a plurality of tags indicating user feelings; acquiring information corresponding to a user feeling indicated by the tag whose registration has been instructed by the user, and generating registration information including the information corresponding to the user feeling added in association with the identification information; and displaying a list of images of tags corresponding to identification information contained in the registration information and displaying information corresponding to a user feeling added in association with identification information corresponding to a tag selected from the list of the images of the tags, on the basis of the generated registration information.

According to another embodiment of the present invention, there is provided a program for causing a computer to execute processing including the steps of acquiring identification information that is contained in a tag whose registration has been instructed by a user and that identifies the tag from among a plurality of tags indicating user feelings; acquiring information corresponding to a user feeling indicated by the tag whose registration has been instructed by the user, and generating registration information including the information corresponding to the user feeling added in association with the identification information; and displaying a list of images of tags corresponding to identification information contained in the registration information and displaying information corresponding to a user feeling added in association with identification information corresponding to a tag selected from the list of the images of the tags, on the basis of the generated registration information.

In an information processing apparatus, method, and program according to embodiments of the present invention, identification information that is contained in a tag whose registration has been instructed and that identifies the tag is acquired from among a plurality of tags indicating user feelings; information corresponding to a user feeling indicated by the tag whose registration has been instructed by the user is acquired, and registration information including the information corresponding to the user feeling added in association with the identification information is generated; and a list of images of tags corresponding to identification information contained in the registration information and information corresponding to a user feeling added in association with identification information corresponding to a tag selected from the list of the images of the tags are displayed on the basis of the generated registration information.

According to an embodiment of the present invention, information related to user feelings arising from experiences and practices of users can be easily recorded and the recorded information can be rapidly understood.

BRIEF DESCRIPTION OF THE DRAWINGS

FIG. 5 illustrates the configuration of a tag;

FIG. 6 illustrates an example of types of tags;

FIG. 8 illustrates the configuration of tag registration data;

FIG. 10 illustrates the configuration of tag registration management data;

FIG. 13 illustrates the tag registration data browsing process;

FIG. 17 illustrates the configuration of a personal computer.

DESCRIPTION OF THE PREFERRED EMBODIMENTS

Before describing preferred embodiments of the present invention, the correspondence between the features of the present invention and embodiments described in the description of the preferred embodiments or the drawings will be discussed below. This description is intended to assure that embodiments supporting the invention are described in the description of the preferred embodiments or the drawings. Thus, even if an embodiment described in the description of the preferred embodiments or the drawings is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

Figure 2:
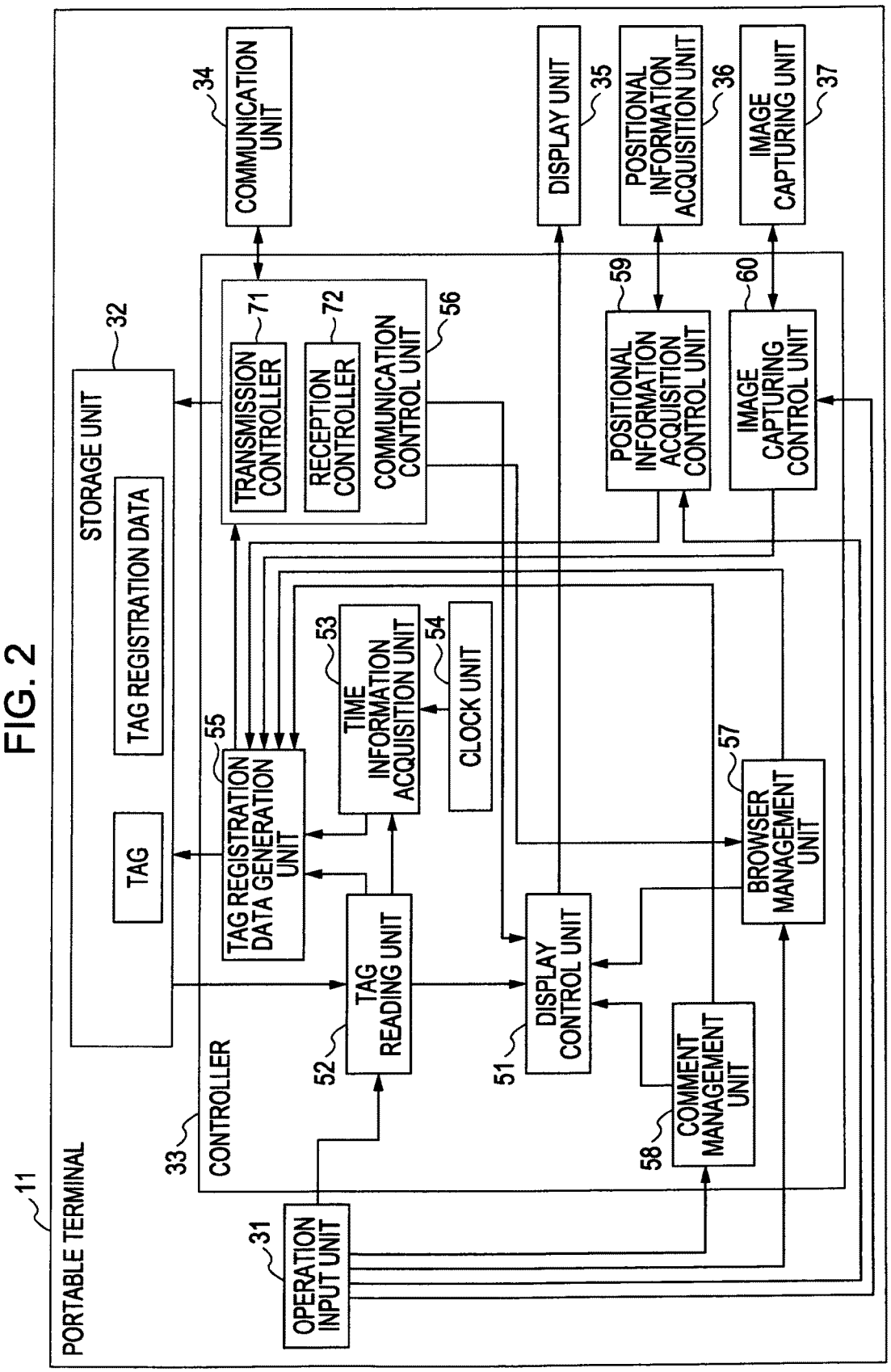
FIG. 2 is a block diagram showing an example of the functional configuration of a portable terminal according to an embodiment of the present invention.

That is, according to an embodiment of the present invention, there is provided an information processing apparatus including identification information acquisition means (for example, a tag reading unit 52 shown in FIG. 2) for acquiring identification information that is contained in a tag whose registration has been instructed by a user and that identifies the tag from among a plurality of tags indicating user feelings; registration information generation means (for example, a tag registration data generation unit 55 shown in FIG. 2) for acquiring information corresponding to a user feeling indicated by the tag whose registration has been instructed by the user and for generating registration information including the information corresponding to the user feeling added in association with the identification information; and display means (for example, a display control unit 51 shown in FIG. 2) for displaying a list of images of tags corresponding to identification information contained in the registration information and displaying information corresponding to a user feeling added in association with identification information corresponding to a tag selected from the list of the images of the tags, on the basis of the registration information generated by the registration information generation means.

The information processing apparatus may further include image capturing means (for example, an image capturing unit 37 shown in FIG. 2) for capturing an image. The registration information generation means (for example, the tag registration data generation unit 55 shown in FIG. 2) may acquire the image captured by the image capturing means as the information corresponding to the user feeling indicated by the tag whose registration has been instructed by the user, and may generate registration information including the information corresponding to the user feeling added in association with the identification information.

The information processing apparatus may further include positional information acquisition means (for example, a positional information acquisition unit 36 shown in FIG. 2) for acquiring positional information. The registration information generation means (for example, the tag registration data generation unit 55 shown in FIG. 2) may acquire the positional information acquired by the positional information acquisition means as the information corresponding to the user feeling indicated by the tag whose registration has been instructed by the user, and may generate registration information including the information corresponding to the user feeling added in association with the identification information.

The information processing apparatus may further include input means (for example, an operation input unit 31 shown in FIG. 2) for entering text information. The registration information generation means (for example, the tag registration data generation unit 55 shown in FIG. 2) may acquire the text information entered by the input means as the information corresponding to the user feeling indicated by the tag whose registration has been instructed by the user, and may generate registration information including the information corresponding to the user feeling added in association with the identification information.

The information processing apparatus may further include transmission means (for example, a transmission controller 71 shown in FIG. 2) for transmitting information to an external apparatus; reception means (for example, a reception controller 72 shown in FIG. 2) for receiving the information from the external apparatus; and selection means for selecting a tag from the list of the images of the tags. The transmission means may transmit the registration information to the external apparatus. The reception means may receive, from the external apparatus, the list of the images of the tags corresponding to the identification information contained in the registration information, on the basis of the registration information. The transmission means may request the external apparatus to supply the information corresponding to the user feeling added in association with the identification information corresponding to the tag selected by the selection means. The reception means may receive the information corresponding to the user feeling transmitted from the external apparatus in response to the request. The display means may display the information corresponding to the user feeling received by the reception means.

Figure 11:
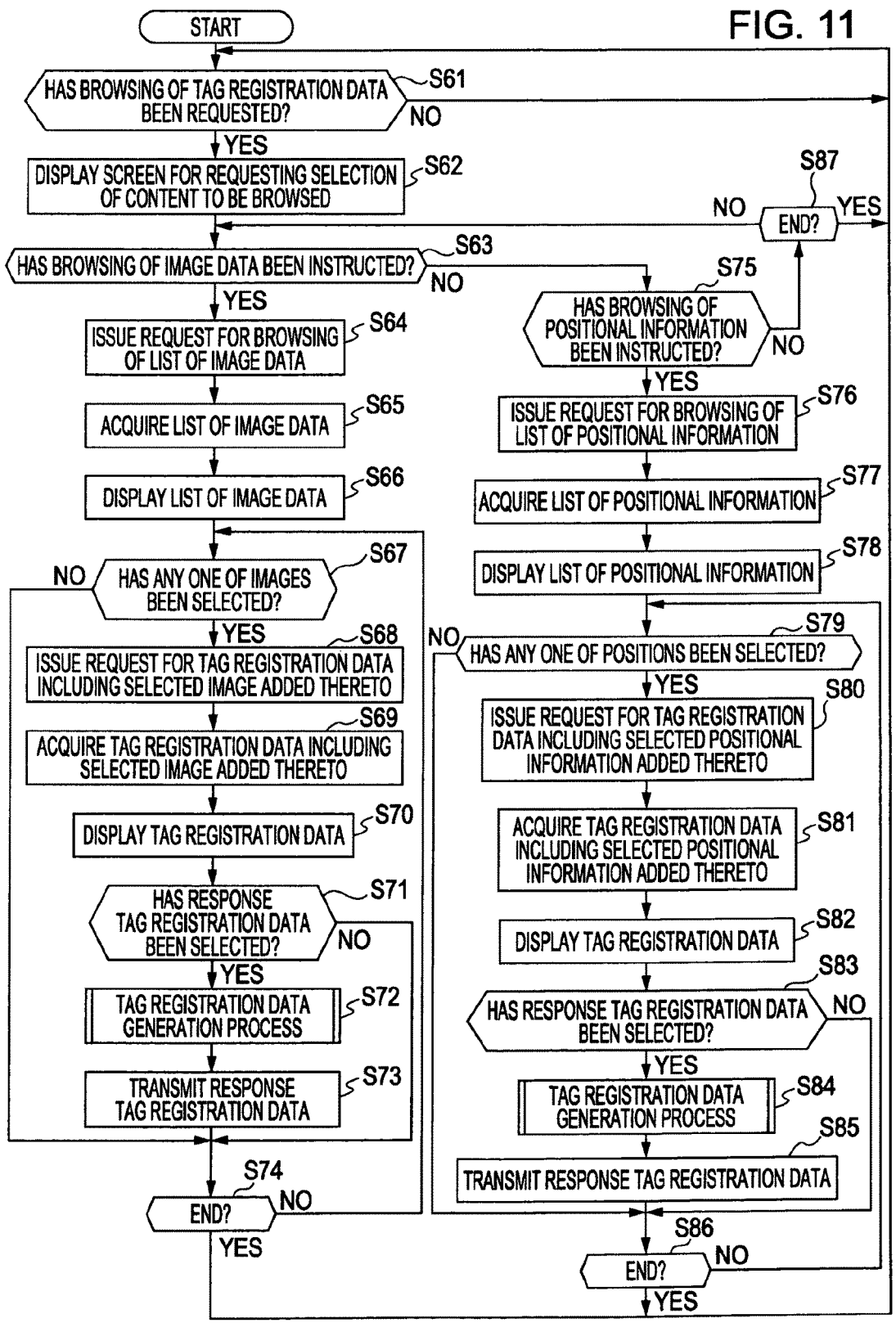
FIG. 11 is a flowchart of a tag registration data browsing process performed by a portable terminal.

According to another embodiment of the present invention, there is provided an information processing method including the steps of acquiring identification information that is contained in a tag whose registration has been instructed by a user and that identifies the tag from among a plurality of tags indicating user feelings (for example, step S5 shown in FIG. 4); acquiring information corresponding to a user feeling indicated by the tag whose registration has been instructed by the user and generating registration information including the information corresponding to the user feeling added in association with the identification information (for example, step S22 shown in FIG. 4); and displaying a list of images of tags corresponding to identification information contained in the registration information and displaying information corresponding to a user feeling added in association with identification information corresponding to a tag selected from the list of the images of the tags, on the basis of the generated registration information (for example, steps S66, S70, S78, and S82 shown in FIG. 11).

Embodiments of the present invention will be described with reference to the drawings.

Figure 1:
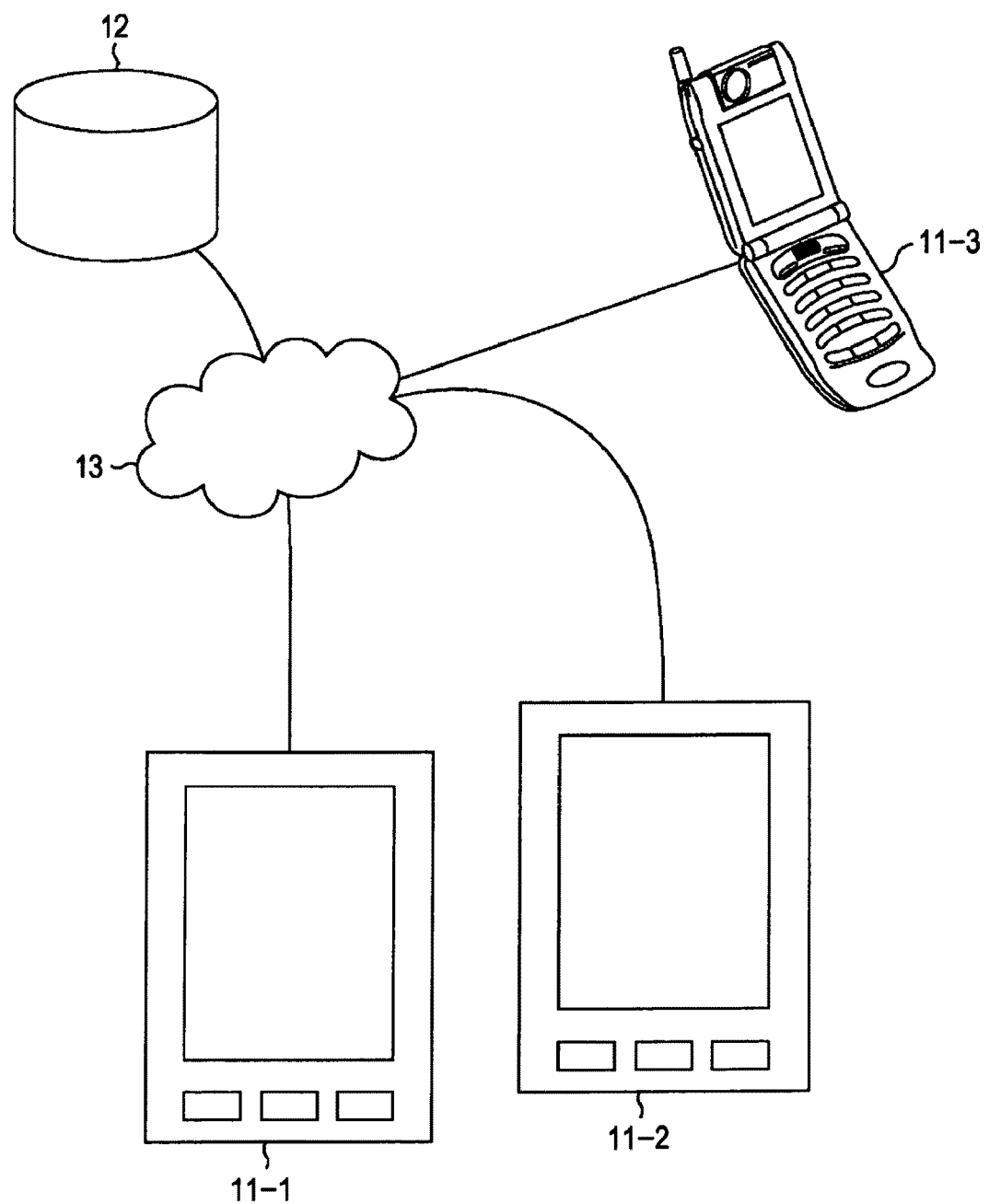
FIG. 1 illustrates an example of the configuration of a tag registration system according to an embodiment of the present invention.

FIG. 1 illustrates an example of the configuration of a tag registration system to which an embodiment of the present invention is applied.

As shown in FIG. 1, the tag registration system includes three portable terminals 11-1 to 11-3 and a tag management server 12, which are connected via the Internet 13 (including access to the Internet 13 via a base station by using a cellular phone or the like).

The portable terminal 11-1 is, for example, a cellular phone. The portable terminals 11-2 and 11-3 are, for example, portable terminals, such as personal digital (data) assistants (PDAs). Note that the number of portable terminals connected to the Internet 13 is not necessarily three. One or two portable terminals or four or more portable terminals may be connected to the Internet 13.

Users operate the portable terminals 11-1 to 11-3, by using applications (for example, AppliCast (registered trademark), a web browser, i-appli (registered trademark), and the like) running on individual platforms, to issue instructions to register tags representing data indicating various feelings in the portable terminals 11-1 to 11-3, and the portable terminals 11-1 to 11-3 transmit information on the registered tags to the tag management server 12.

Note that registration of a tag representing data indicating a feeling is equivalent to generation of tag registration data, which will be described later with reference to FIG. 5.

When users of the portable terminals 11-1 to 11-3 experience some feelings in daily life, they operate the portable terminals 11-1 to 11-3 to issue instructions to register tags representing the feelings in the portable terminals 11-1 to 11-3. By such an operation, for example, a user is able to register, in a time-series manner, tags corresponding to various feelings arising from sightseeing in scenic areas during a trip or the like. When the user goes over the registered tags in a time-series manner, the user is able to recall his/her actions in the scenic areas and feelings arising from the actions. Thus, detailed records of the trip providing a sense of presence can be obtained.

In the descriptions below, in a case where the portable terminals 11-1 to 11-3 are not necessarily distinguished from each other, one of the portable terminals 11-1 to 11-3 is simply referred to as a portable terminal 11.

The tag management server 12 stores (manages) information on a tag transmitted from the portable terminal 11. Information on a tag stored in the tag management server 12 is shared among the portable terminals 11-1 to 11-3.

An example of the configuration of the portable terminal 11 will be described with reference to FIG. 2.

The portable terminal 11 includes an operation input unit 31, a storage unit 32, a controller 33, a communication unit 34, a display unit 35, a positional information acquisition unit 36, and an image capturing unit 37.

The operation input unit 31 is operated by a user to input an instruction or the like to the portable terminal 11. The operation input unit 31 supplies an operation signal indicating the details of the operation to the controller 33.

In a case where the portable terminal 11 is a PDA, the operation input unit 31 includes, for example, a keyboard and a mouse. In addition, in a case where the portable terminal 11 is a cellular phone, the operation input unit 31 includes, for example, keys to be used for entering dial numbers for call origination. In addition, the operation input unit 31 may include a touch panel provided over the display unit 35, which will be described later.

The storage unit 32 includes, for example, a random-access storage medium such as a flash memory. Various data, computer programs, and the like are stored in the storage unit 32.

Tags representing data indicating various feelings are stored in the storage unit 32. Tags may be stored in advance in the storage unit 32. Alternatively, tags may be downloaded from a server, such as the tag management server 12, to the portable terminal 11 and stored in the storage unit 32.

In addition, tag registration data, in which, for example, a comment, an image, positional information, or the like is added to a tag identification (ID), time information indicating the time at which registration of the tag is instructed, and a user ID for identifying the user, which serve as identification information for identifying a tag whose registration has been instructed by a user, in association with the identification information, is stored in the storage unit 32.

The controller 33 includes, for example, a microprocessor and controls the entire portable terminal 11. The details of the controller 33 will be described later.

The communication unit 34 transmits and receives various data via a network such as the Internet 13. In a case where the portable terminal 11 is a PDA, the communication unit 34 serves as, for example, a network interface that performs wire communications. In addition, in a case where the portable terminal 11 is a cellular phone, for example, the communication unit 34 is configured to include an antenna that performs wireless communications. In this case, the communication unit 34 transmits and receives various data via the Internet 13 through wireless communication with a base station (not illustrated).

The display unit 35 includes, for example, a display device such as a liquid crystal display (LCD) or an organic electroluminescence (EL) display. The display unit 35 displays various images on the basis of image data supplied from the controller 33.

The positional information acquisition unit 36 is controlled by a positional information acquisition control unit 59 of the controller 33. The positional information acquisition unit 36 acquires information on a position on the earth (latitude and longitude) by using a so-called global positioning system (GPS) or the like on the basis of a signal from a satellite (not illustrated), and supplies the acquired information to the positional information acquisition control unit 59.

The image capturing unit 37 includes an optical mechanism and an image capturing element. The image capturing unit 37 captures an image under the control of an image capturing control unit 60, and supplies image data serving as an image capturing result to the image capturing control unit 60.

When a central processing unit (CPU), which is not illustrated, performs a computer program, the controller 33 functions as a display control unit 51, a tag reading unit 52, a time information acquisition unit 53, a clock unit 54, a tag registration data generation unit 55, a communication control unit 56, a browser management unit 57, a comment management unit 58, the positional information acquisition control unit 59, and the image capturing control unit 60.

The display control unit 51 generates an image to be displayed on the display unit 35 on the basis of information supplied from the tag reading unit 52, the communication control unit 56, the browser management unit 57, and the comment management unit 58, and displays the generated image on the display unit 35.

The tag reading unit 52 reads a tag, which indicates a user feeling, whose registration has been instructed by a user, in accordance with an operation signal from the operation input unit 31.

More specifically, the tag reading unit 52 reads a tag, which indicates a user feeling, whose registration has been instructed, from among tags indicating various feelings stored in the storage unit 32, in accordance with an operation signal that is supplied from the operation input unit 31 and that corresponds to a user operation for issuing an instruction to register the tag.

The tag reading unit 52 supplies a tag ID of the tag, which has been read from the storage unit 32, to the tag registration data generation unit 55, and supplies icon image data and color data in association with the tag ID to the display control unit 51.

In addition, in accordance with the operation signal that is supplied from the operation input unit 31 and that corresponds to the user operation for issuing the instruction to register the tag, the tag reading unit 52 supplies, to the time information acquisition unit 53, an instruction to acquire the time at which the registration of the tag is instructed.

The time information acquisition unit 53 acquires from the clock unit 54, on the basis of the instruction from the tag reading unit 52, time information indicating the time (current time) at which registration of the tag is instructed. The time information acquisition unit 53 supplies, to the tag registration data generation unit 55, the time information acquired from the clock unit 54.

The clock unit 54 outputs the current date and time (year, month, date, hour, minutes, and seconds), and supplies the current date and time as time information to the time information acquisition unit 53.

The tag registration data generation unit 55 generates tag registration data and supplies the generated tag registration data to the storage unit 32. More specifically, when receiving a tag ID from the tag reading unit 52, the tag registration data generation unit 55 generates tag registration data on the basis of the received tag ID, time information supplied from the time information acquisition unit 53, and a user ID set in advance, and supplies the generated tag registration data to the storage unit 32.

The browser management unit 57 controls the communication control unit 56, in accordance with an operation signal, to request, using the communication unit 34, the tag management server 12 to supply various data. In addition, the browser management unit 57 converts the supplied data into a format that can be displayed on a browser screen, and supplies the resultant data to the display control unit 51 so as to be displayed on the display unit 35.

The comment management unit 58 receives text data entered by the user as a comment in accordance with an operation signal from the operation input unit 31, and supplies the received text data indicating the comment to the tag registration data generation unit 55.

The positional information acquisition control unit 59 controls an operation of the positional information acquisition unit 36 to acquire positional information, in accordance with an operation signal from the operation input unit 31, and supplies the acquired positional information to the tag registration data generation unit 55.

The image capturing control unit 60 controls the image capturing unit 37 to capture an image in accordance with an operation signal from the operation input unit 31, and supplies data of the captured image to the tag registration data generation unit 55.

Figure 3:
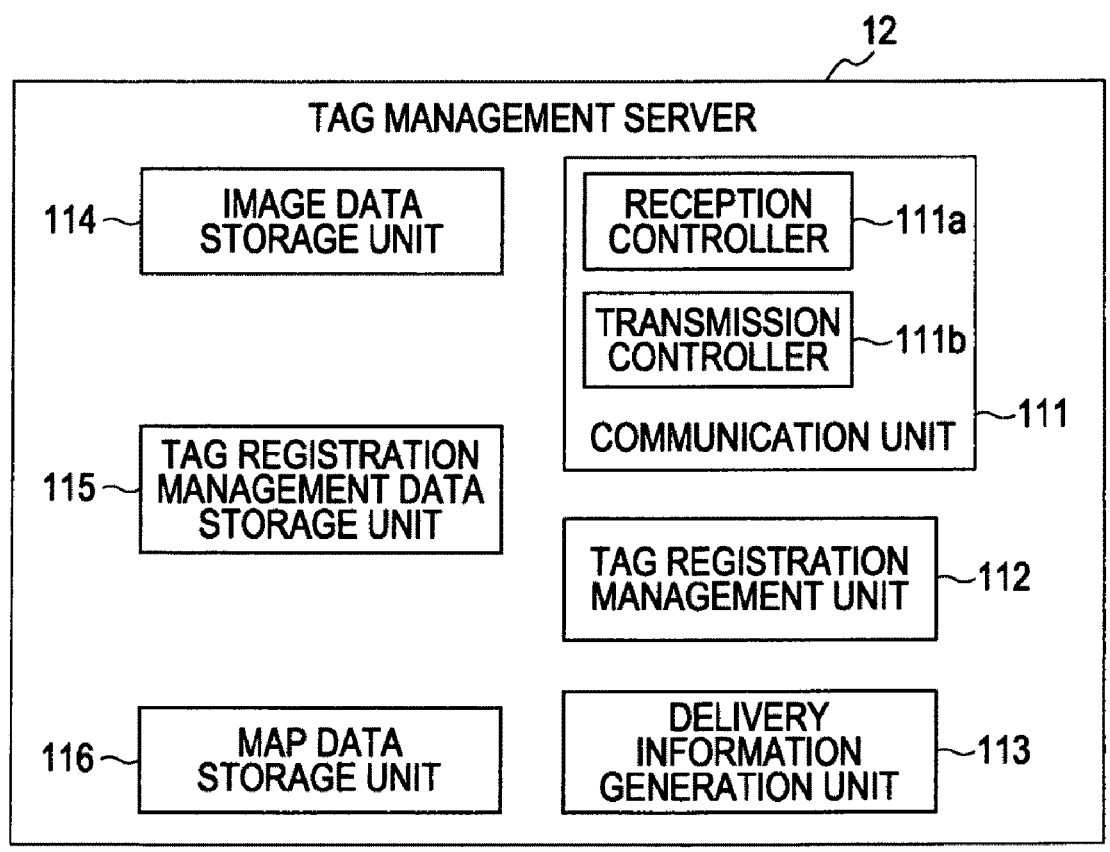
FIG. 3 is a block diagram showing an example of the hardware configuration of a tag management server.

An example of the configuration of the tag management server 12 will be described with reference to FIG. 3.

The tag management server 12 includes a communication unit 111, a tag registration management unit 112, a delivery information generation unit 113, an image data storage unit 114, a tag registration management data storage unit 115, and a map data storage unit 116.

The communication unit 111 includes a reception controller 111a and a transmission controller 111b. The communication unit 111 also includes a network interface and transfers various data to and from the portable terminals 11-1 and 11-3 via the Internet 13.

The tag registration management unit 112 updates tag registration management data on the basis of tag registration data supplied via the communication unit 111 from the portable terminals 11-1 to 11-3, and stores the updated tag registration management data in the tag registration management data storage unit 115. In addition, the tag registration management unit 112 stores image data associated with the tag registration data in the image data storage unit 114.

The delivery information generation unit 113 generates delivery data on the basis of tag registration management data managed in the tag registration management data storage unit 115, and delivers the generated delivery data via the communication unit 111 to the portable terminals 11-1 to 11-3 so that the delivered tag registration data can be shared among the portable terminals 11-1 to 11-3. In addition, in a case where a uniform resource identifier (URI), which indicates the position where image data contained in tag registration data is stored, is designated by one of the portable terminals 11-1 to 11-3 and image data is requested to be delivered via the communication unit 111, the delivery information generation unit 113 controls the communication unit 111 to deliver the image data to the portable terminals 11-1 to 11-3. Furthermore, in a case where positional information contained in tag registration data is designated by one of the portable terminals 11-1 to 11-3 and map data of neighboring positions is requested to be delivered via the communication unit 111, the delivery information generation unit 113 controls the communication unit 111 to read map data stored in the map data storage unit 116 and to deliver the read map data to the portable terminals 11-1 to 11-3.

A tag registration data generation process performed by the portable terminal 11 will be described with reference to a flowchart shown in FIG. 4.

In step S1, the tag reading unit 52 of the controller 33 determines whether or not the operation input unit 31 has been operated to set a tag registration mode. The tag reading unit 52 repeats the processing of step S1 until the tag registration mode is set. For example, in a case where it is determined in step S1 that the operation input unit 31 has been operated to set the tag registration mode, the tag reading unit 52 reads information on tags stored in the storage unit 32, supplies the read information to the display control unit 51, generates images of the list of tags, and displays the tag list images on the display unit 35 in step S2.

More specifically, information on a tag is read from the storage unit 32, for example, as shown in FIG. 5. Information on a tag is constituted by a tag ID, a name, icon image data, and color data.

A tag ID is information for identifying a tag. More specifically, for example, a tag ID is represented as a three-digit numeric value, which falls within a range from 001 to 999. However, a tag ID is not necessarily a numeric value. A tag ID may be a letter sequence.

A name serves as text data indicating a user feeling (the kind of feeling) represented by a tag. More specifically, for example, a name represents a feeling, such as "smiling", "delicious", "angry", "surprised", "comfortable", "fascinated", "disgusted", "crying", or "cool". In addition, tags indicating other various feelings are also available.

Icon image data is image data for displaying an icon representing a feeling represented by a tag. For example, on the basis of icon image data of a tag indicating the feeling "smiling", an icon expressing a smile face is displayed. In addition, for example, on the basis of icon image data of a tag indicating "delicious" (that is, the feeling of a user when the user is satisfied with delicious food), an icon expressing a facial expression when a human is satisfied with delicious food is displayed.

Color data is information for designating the color of an icon displayed on the basis of icon image data. Data indicating a color that is able to evoke a specific feeling represented by a tag is used as color data. For example, yellow is used as a color that evokes the feeling "smiling", and blue is used as a color that evokes the feeling "comfortable".

On the basis of such information on tags, various tags are represented, for example, as shown in FIG. 6.

As shown in FIG. 6, a tag whose tag ID is "001", which represents the feeling "smiling", includes image data expressing a smile face as icon image data representing the feeling whose name is "smiling" and a yellow color as color data.

A tag whose tag ID is "002", which represents "delicious" (that is, the feeling of a user when the user is satisfied with delicious food), includes image data expressing the face of a human when the human is satisfied with delicious food as icon image data representing the feeling whose name is "delicious" and an orange color as color data.

A tag whose tag ID is "003", which represents the feeling "angry", includes image data expressing the face of a human when the human feels angry as icon image data representing the feeling whose name is "angry" and a red color as color data.

A tag whose tag ID is "004", which represents the feeling "surprised", includes image data expressing the face of a human when the human is surprised as icon image data representing the feeling whose name is "surprised" and a green color as color data.

A tag whose tag ID is "005", which represents the feeling "comfortable", includes image data expressing the face of a human when the human feels comfortable as icon image data representing the feeling whose name is "comfortable" and a blue color as color data.

A tag whose tag ID is "006", which represents the feeling "fascinated", includes image data expressing the face of a human when the human is fascinated by something as icon image data representing the feeling whose name is "fascinated" and a pink color as color data.

A tag whose tag ID is "007, which represents the feeling "disgusted", includes image data expressing the face of a human when the human is disgusted by something as icon image data representing the feeling whose name is "disgusted" and a black color as color data.

A tag whose tag ID is "008", which represents the feeling "crying", includes image data expressing the face of a human when the human wants to cry as icon image data representing the feeling whose name is "crying" and a bluish-purple color as color data.

A tag whose tag ID is "009", which represents "cool" (that is, the feeling of a user when the user feels that something/ someone is cool), includes image data expressing the face of a human who is wearing sunglasses as icon image data representing the feeling whose name is "cool" and a reddish-purple color as color data.

Note that the types of tags are not necessarily limited to the above-described nine types of tags. Other types of tags may be added later by a user.

Figure 7:
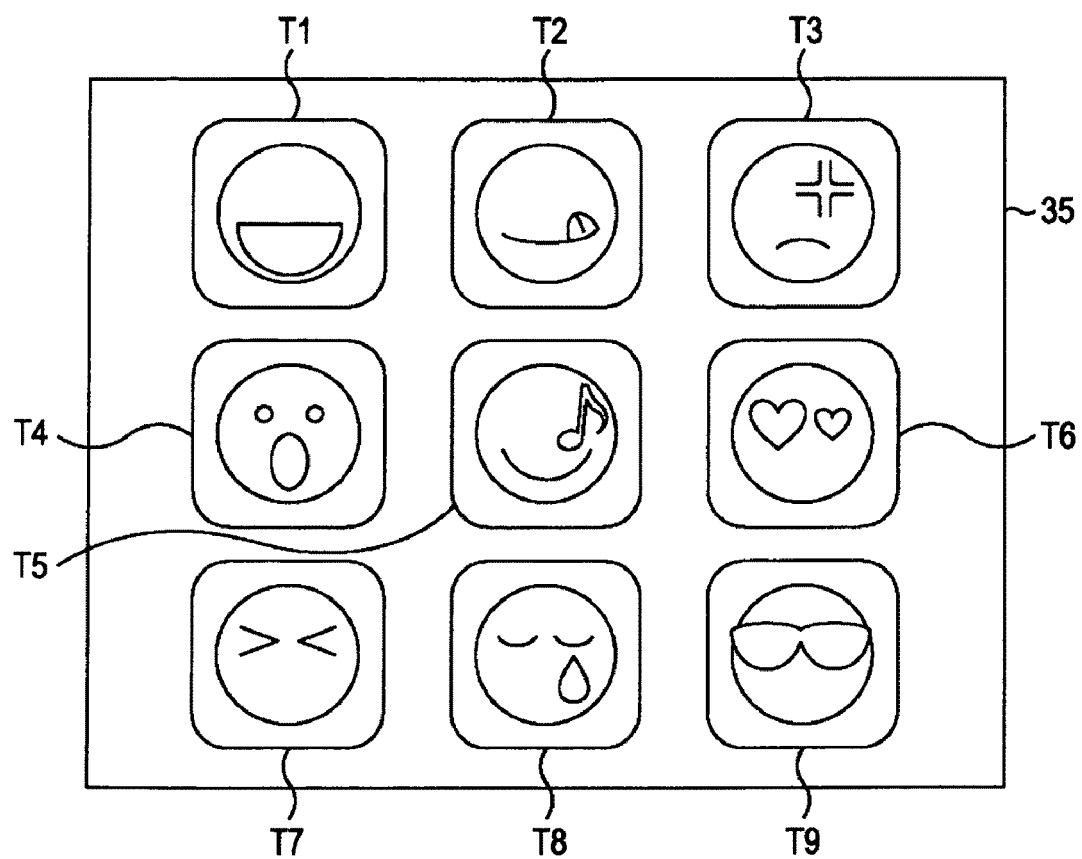
FIG. 7 illustrates a display example of a tag selection screen.

On the basis of such tag information, images of the list of tags are displayed on the display unit 35, for example, as shown in FIG. 7.

In the tag list images shown in FIG. 7, tags T1 to T9 are displayed on the display unit 35. The tags T1 to T9 indicate tags corresponding to the tag IDs "001" to "009". The tags T1 to T9 can be selected by using the operation input unit 31. When one of the tags T1 to T9 is selected, a signal indicating that registration of the tag has been instructed is generated by the operation input unit 31 and supplied to the tag reading unit 52.

Figure 4:
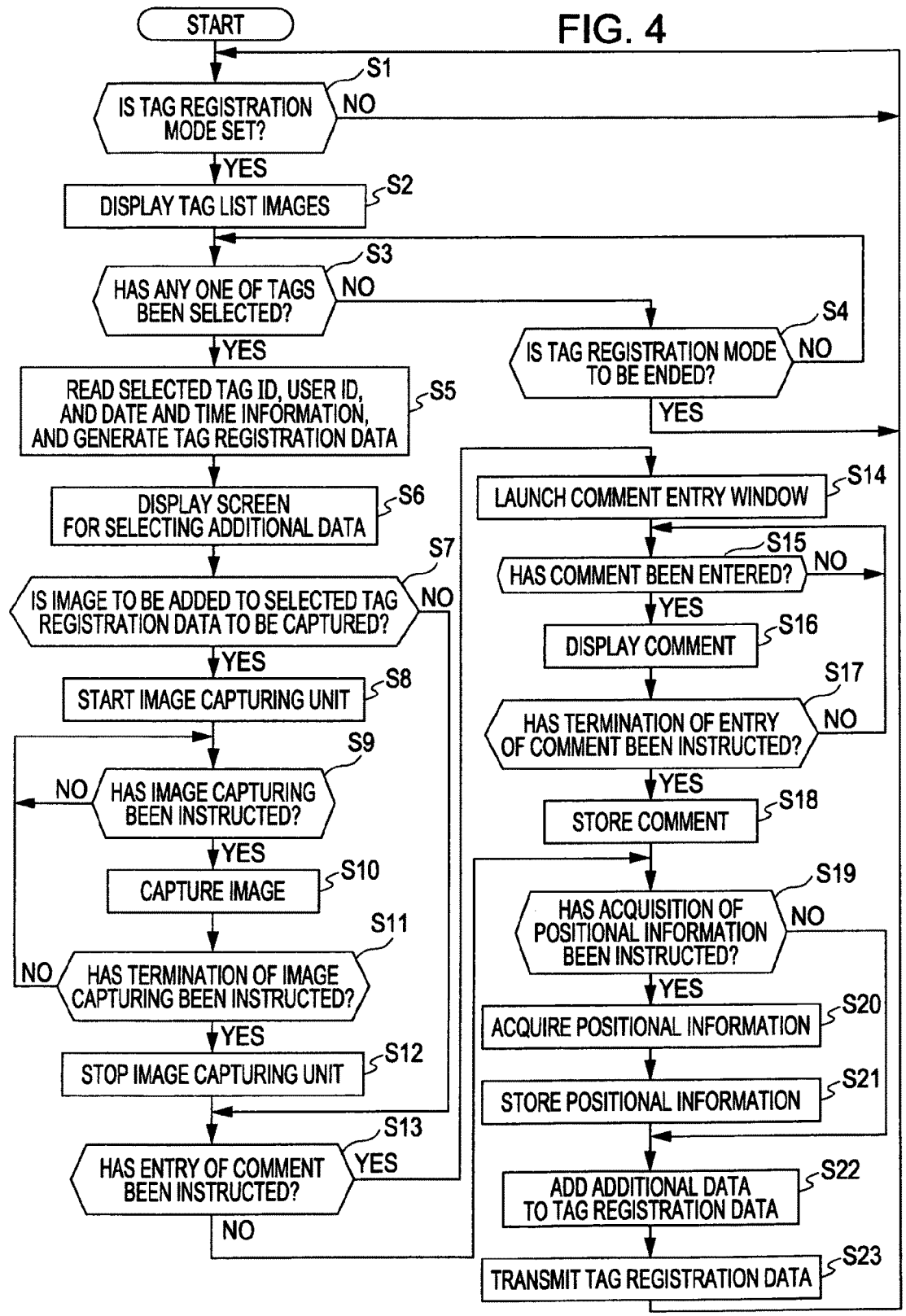
FIG. 4 is a flowchart of a tag registration data generation process.

Referring back to the flowchart shown in FIG. 4, in step S3, the tag reading unit 52 determines whether or not the operation input unit 31 has been operated to select one of the tags displayed on the display unit 35.

In a case where it is determined in step S3 that the operation input unit 31 has not been operated, the tag reading unit 52 determines whether or not the operation input unit 31 has been operated to issue an instruction to terminate the tag registration mode in step S4. In a case where it is determined in step S4 that termination of the tag registration mode has not been instructed, the process returns to step S3. That is, in a case where no tag has been selected and termination of the tag registration mode has not been instructed in a state where the tag list images are displayed, the processing of steps S3 and S4 is repeated. Then, for example, in a case where it is determined in step S4 that termination of the tag registration mode has been instructed, the process returns to step S1.

For example, in a case where the user wants to report that he/she is fascinated by beautiful scenery and it is determined in step S3 that the tag T6 is selected from the tag list images shown in FIG. 7 and registration of the tag T6 is instructed, the operation input unit 31 generates an operation signal corresponding to the tag ID "006", which indicates the selected tag, in accordance with the operation performed by the user, and supplies the generated operation signal to the tag reading unit 52 in step S5. The tag reading unit 52 accesses the storage unit 32 in accordance with the operation signal to read stored information on the tag, and supplies the read information to the tag registration data generation unit 55. The tag registration data generation unit 55 generates tag registration data corresponding to the selected tag, on the basis of the information supplied from the tag reading unit 52. Then, the tag registration data generation unit 55 requests the time information acquisition unit 53 to send information on the current time. The time information acquisition unit 53 reads the current time from the clock unit 54, and supplies the read current time to the tag registration data generation unit 55. The tag registration data generation unit 55 generates tag registration data on the basis of a user ID, which is stored in advance in a memory (not illustrated), the time information, and the tag ID, and the generated tag registration information is stored in the storage unit 32.

That is, in this case, since the tag T6 shown in FIG. 7 is selected, the tag registration data generation unit 55 generates tag registration data shown in FIG. 8 on the basis of the operation signal indicating that the tag ID "006" is selected, as described above with reference to FIG. 6. Referring to FIG. 8, the tag registration data is constituted by a tag ID, a user ID, time information, comment information, positional information, and content information, which are arranged in that order from the left in the figure.

A user ID, such as, for example, the name of a user of the portable terminal 11, is information for identifying a user. The user ID is set by an operation performed by the user of the portable terminal 11 using the operation input unit 31 and is stored in advance in a memory (not illustrated).

Time information represents the time at which registration of a tag for corresponding content is instructed. For example, the time information represents date and time to the second (year, month, date, hour, minutes, and seconds).

Comment information is text information on a comment to be registered when tag generation data is generated. The comment information will be described later.

Positional information is information on the latitude and longitude on the earth when tag registration data is generated.

Content information is data of content generated when tag registration data is generated or a URI indicating the position where data of content is stored.

Note that a tag ID, a user ID, and time information are treated as identification information for identifying a tag whose registration has been instructed and are stored as specific information in step S5, whereas comment information, positional information, and content information are additional data of a tag whose registration has been instructed and only storage areas are allocated in step S5.

In step S6, the tag reading unit 52 instructs the display control unit 51 to display, on the display unit 35, information for selecting additional data to be added to the selected tag. In response to the instruction, the display control unit 51 displays a screen for issuing a request to select additional data to be added to the selected tag.

In step S7, the image capturing control unit 60 determines whether or not the operation input unit 31 has been operated to capture image data as additional data to be added to the selected tag registration data.

For example, in a case where it is determined in step S7 that the operation input unit 31 has been operated to issue an instruction to capture image data as additional data, the image capturing control unit 60 starts the image capturing unit 37 in step S8. Then, in step S9, the image capturing control unit 60 determines whether or not the operation input unit 31 has been operated to issue an instruction to capture image data, and repeats similar processing until image capturing is instructed. For example, in a case where the operation input unit 31 is operated to issue an instruction to capture image data in a state where the image capturing unit 37 is directed at the scenery by which the user is fascinated, the image capturing control unit 60 controls the image capturing unit 37 to capture an image of the scenery by which the user is fascinated and supplies the captured image data to the image capturing control unit 60 in step S10. The image capturing control unit 60 supplies the received image data to the tag registration data generation unit 55, and the image data is stored in the tag registration data generation unit 55.

In step S11, the image capturing control unit 60 determines whether or not the operation input unit 31 has been operated to issue an instruction to terminate image capturing. In a case where termination of image capturing has not been instructed, the process returns to step S9. That is, the processing of steps S9 to S11 is repeated until it is determined in step S11 termination of image capturing has been instructed. In a case where it is determined in step S11 that termination of image capturing has been instructed, the image capturing control unit 60 stops the operation state of the image capturing unit 37 in step S12 to terminate image capturing processing.

In a case where it is determined in step S7 that no image has been selected as additional data to be added to the selected tag registration data, the processing of steps S8 to S12 is skipped.

In step S13, the comment management unit 58 determines whether or not the operation input unit 31 has been operated to enter a comment as additional data to be added to the selected tag registration data.

For example, in a case where it is determined in step S13 that the operation input unit 31 has been operated to issue an instruction to enter a comment as additional data, the comment management unit 58 causes the display control unit 51 to display a comment entry window on the display unit 35, and launches the comment entry window in step S14. Then, in step S15, it is determined whether or not the operation input unit 31 has been operated to enter a comment as text data. Similar processing is repeated until text data serving as a comment is entered. For example, in a case where the operation input unit 31 has been operated to enter, as text data, a comment about scenery by which the user is fascinated, the comment management unit 58 controls the display control unit 51 to display, on the display unit 35, the text data of the entered comment about the scenery by which the user is fascinated, and supplies the text data of the entered comment to the tag registration data generation unit 55 in step S16.

In step S17, the comment management unit 58 determines whether or not the operation input unit 31 has been operated to issue an instruction to terminate the entry of a comment. In a case where termination of the entry of a comment has not been instructed, the process returns to step S15. That is, until it is determined in step S17 that termination of the entry of a comment has been instructed, the processing of steps S15 to S17 is repeated. In a case where it is determined in step S17 that termination of the entry of a comment has been instructed, the comment management unit 58 supplies the entered comment to the tag registration data generation unit 55, and the comment is stored in the tag registration data generation unit 55 in step S18. Then, the comment entry processing is completed.

In a case where it is determined in step S13 that no comment has been selected as additional data to be added to the selected tag registration data, the processing of steps S14 to S18 is skipped.

In step S19, the positional information acquisition control unit 59 determines whether or not the operation input unit 31 has been operated to acquire positional information as additional data to be added to the selected tag registration data.

For example, in a case where it is determined in step S19 that the operation input unit 31 has been operated to issue an instruction to acquire positional information as additional data, the positional information acquisition control unit 59 causes the positional information acquisition unit 36 to acquire positional information in step S20. Then, in a case where the positional information acquisition unit 36 acquires positional information on the basis of a signal from a satellite (not illustrated), the positional information acquisition unit 36 supplies the acquired positional information to the positional information acquisition control unit 59. The positional information acquisition control unit 59 supplies the positional information to the tag registration data generation unit 55.

In step S21, the positional information supplied to the tag registration data generation unit 55 is stored in the tag registration data generation unit 55.

In a case where it is determined in step S19 that no positional information has been selected as additional data to be added to the selected tag registration data, the processing of steps S20 and S21 is skipped.

In step S22, the tag registration data generation unit 55 adds, as additional data, the image data captured by the processing of steps S7 to S12, the text data of the comment entered by the processing of steps S13 to S18, and the positional information acquired by the processing of steps S20 and S21 to the generated tag registration data, and the resultant data is stored as tag registration data in the storage unit 32. Note that as described above, the image data, the comment, and the positional information are acquired in a case where instructions to add image data, a comment, and positional information as additional data are issued. Thus, in a case where no instruction of addition has been issued, such data is not added to the tag registration data. Therefore, tag registration data can be constituted by only information identified only by a tag ID, a user ID, and time information, and a user feeling at a certain time can be easily registered as a tag. In addition, by the process described above, as well as the tag ID, the user ID, and the time information, additional data such as an image, a comment, and positional information can be added to tag registration data, and the resultant tag registration data can be registered.

In step S23, the tag registration data generation unit 55 supplies the generated tag registration data to the communication control unit 56. The communication control unit 56 controls a transmission controller 71 to transmit the supplied tag registration data using the communication unit 34 via the Internet 13 to the tag management server 12.

By the process described above, when the user experiences a certain feeling, a tag indicating the feeling can be registered, and a tag ID, a user ID, and time information of the registered tag can be supplied to the tag management server 12. Accordingly, feelings experienced by the user can be sequentially stored in the tag management server 12. Furthermore, tag registration data can be registered together with image data, a comment (text data), and positional information, as well as a tag ID, a user ID, and time information.

Figure 9:
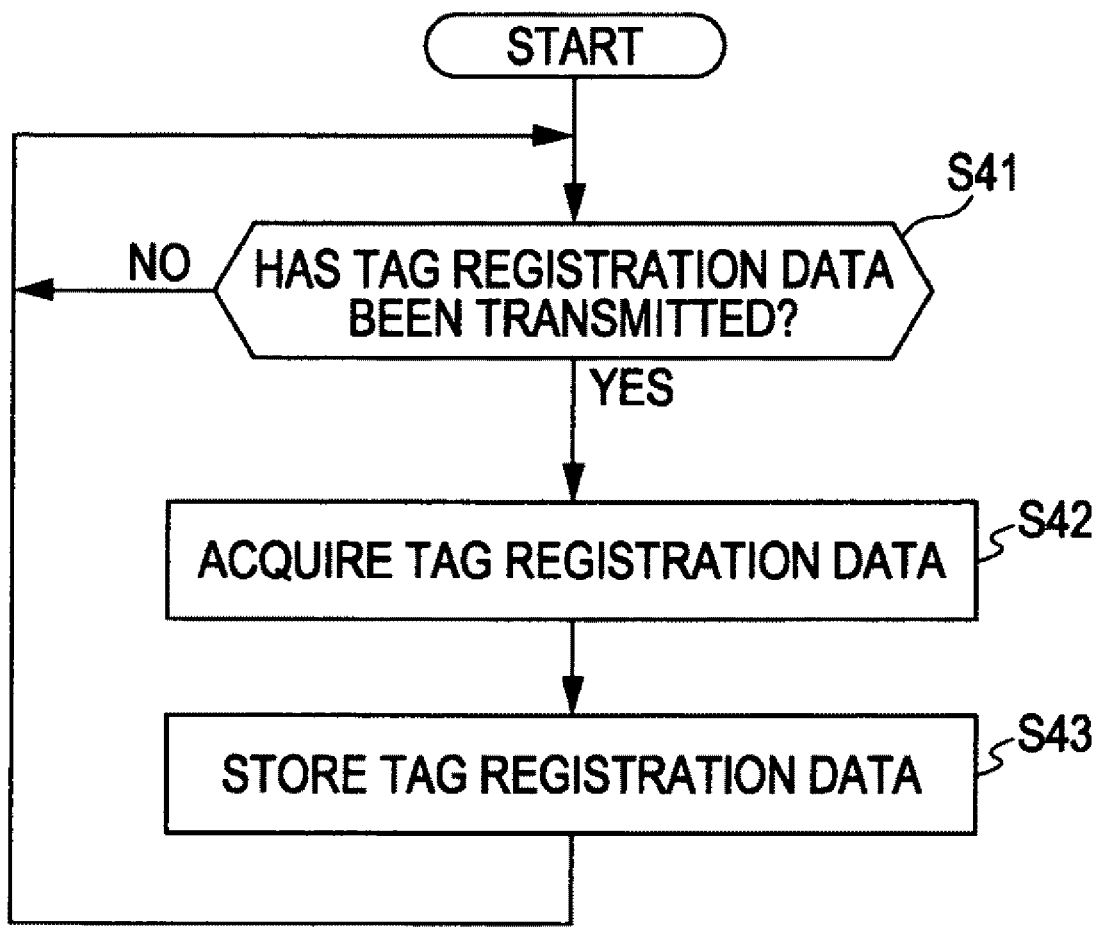
FIG. 9 is a flowchart of a tag registration data storage process.

A registration data storage process performed by the tag management server 12 will now be described with reference to a flowchart shown in FIG. 9.

In step S41, the tag registration management unit 112 controls the reception controller 111a of the communication unit 111 to determine whether or not registration data has been transmitted from any one of the portable terminals 11-1 to 11-3. Similar processing is repeated until registration data has been transmitted. For example, in a case where it is determined in step S41 that tag registration data is transmitted from the portable terminal 11 by the processing of step S23 of the flowchart shown in FIG. 4, the tag registration management unit 112 receives, via the reception controller 111a of the communication unit 111, the transmitted tag registration data in step S42.

In step S43, the tag registration management unit 112 stores the received tag registration data, as, for example, tag registration management data shown in FIG. 10, in association with the tag ID, in the tag registration management data storage unit 115. In addition, in a case where image data has been added as additional data to the tag registration data, the tag registration management unit 112 stores the image data in the image data storage unit 114.

The tag registration management data is constituted by a tag ID, a user ID, time information, comment information, positional information, content storage position information, the number of accesses, and response tag information, as shown in FIG. 10. Since the tag ID, the user ID, the time information, the comment information, and the positional information are the same as those in the tag registration data described above with reference to FIG. 8, the explanations of those same data will be omitted. The content storage position information represents the position at which data added as additional data is stored. The content storage position information is, for example, a URI. In a case where, for example, image data serving as additional data is stored in the image data storage unit 114, storage position information (URI) constituted by a directory in which the image data is stored can be acquired from the content storage position information.

The number of accesses represents the number of accesses made by other users to registered tag registration management data. The number of accesses is counted and recorded by the processing described later. Note that at a point in time when tag registration management data is generated, the number of accesses made by other users to the tag registration management data is "0".

In addition, the response tag information represents tag registration data registered by a user who accessed the tag registration management data and sent a response to the tag registration management data. Note that since the response tag registration data is similar to the tag registration data described above with reference to FIG. 8, the explanation of the response tag registration data will be omitted. In addition, in the initial processing, only an area for response tag registration data is allocated and the actual response tag registration data is not recorded.

By the process described above, the tag management server 12 is capable of registering tag registration data transmitted from the portable terminal 11 in association with the user ID in the tag registration management data storage unit 115. Thus, in a case where downloading is requested from the portable terminal 11 by the process described later, the tag management server 12 is capable of delivering tag registration data corresponding to the user ID for which downloading is requested. Thus, tag registration data stored in the tag management server 12 can be shared among a plurality of portable terminals 11.

Figure 12:
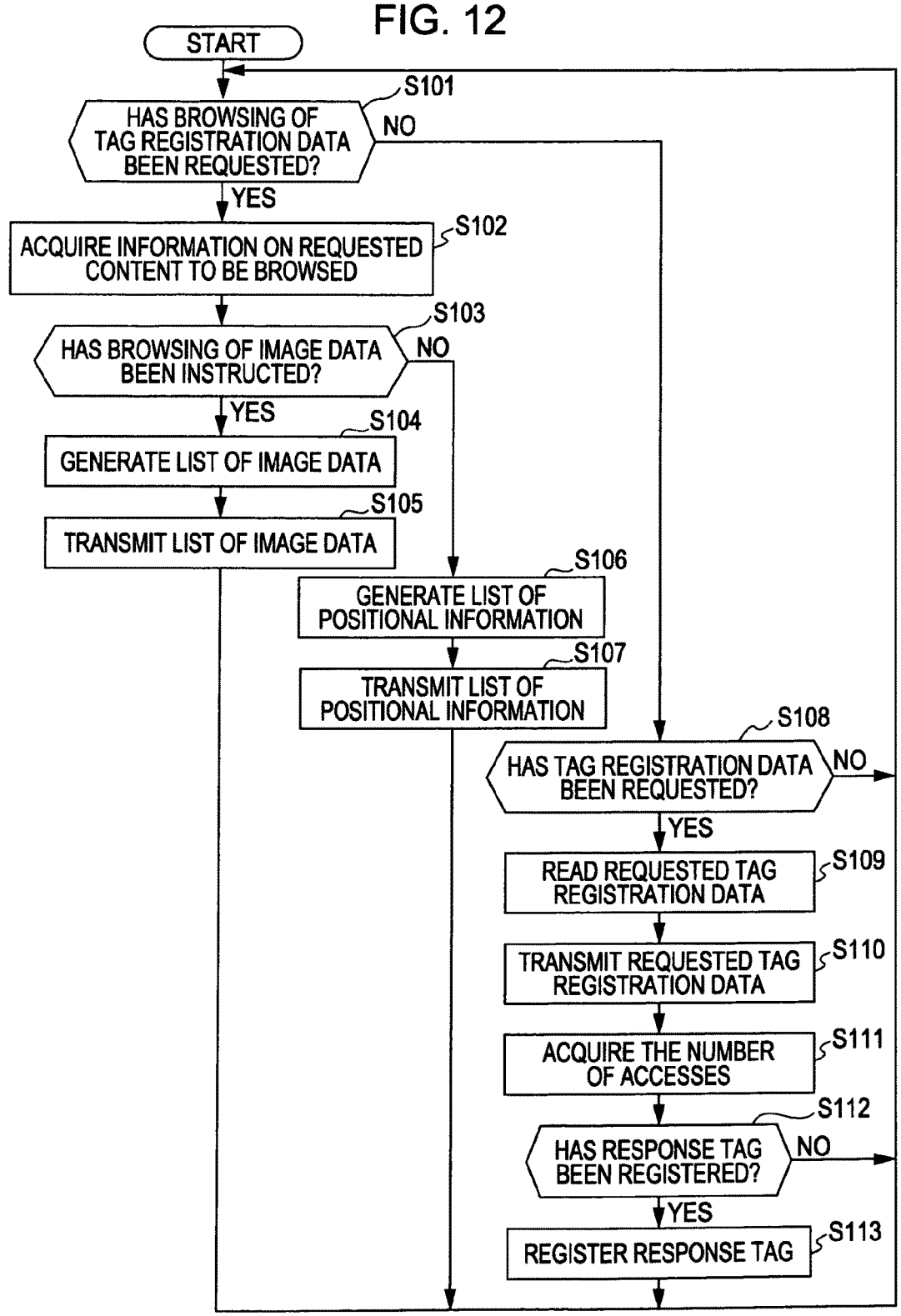
FIG. 12 is a flowchart of the tag registration data browsing process performed by a tag management server.

A process in which the portable terminal 11 accesses the tag management server 12 to download tag registration data and the tag registration data of a specific user (specific user ID) is browsed on the display unit 35 will be described with reference to flowcharts shown in FIGS. 11 and 12.

In step S61, the browser management unit 57 determines whether or not the operation input unit 31 has been operated to issue a request for browsing of tag registration data. Similar processing is repeated until browsing has been requested.

For example, in a case where it is determined in step S61 that the user has operated the operation input unit 31 to issue a request for browsing of tag registration data, for example, by entering the URL of the tag management server 12 in which the tag registration data is managed and issuing an instruction for browsing, the browser management unit 57 controls the display control unit 51 to display, on the display unit 35, an image to be used for selecting one of browsing of a list of image data and browsing of a list of positional data registered as additional data of the tag registration data in step S62.

In step S63, the browser management unit 57 determines whether or not browsing of a list of image data has been instructed. For example, in a case where the operation input unit 31 has been operated to issue an instruction for browsing of a list of image data and to enter the URL or the like of the corresponding tag management server 12, the browser management unit 57 controls the transmission controller 71 of the communication control unit 56 to request, from the communication unit 34 via the Internet 13, the tag management server 12 for browsing of a list of image data registered as additional data from the tag registration data, on the basis of the corresponding URL, in step S64.

In accordance with this, in step S101 (see FIG. 12), the delivery information generation unit 113 controls the reception controller 111a of the communication unit 111 to determine whether or not browsing of tag registration data has been requested from the portable terminal 11. For example, in a case where browsing of a list of image data serving as additional data of tag registration data has been requested by the processing of step S64 of FIG. 11, the delivery information generation unit 113 controls the reception controller 111a of the communication unit 111 to receive information indicating that browsing of the tag registration data has been requested and to acquire information on the requested content to be browsed in step S102.

In step S103, the delivery information generation unit 113 determines whether or not browsing of image data among additional data of the tag registration data has been requested. In this case, since browsing of image data has been requested, the delivery information generation unit 113 reads, from the image data storage unit 114, image data registered as additional data in association with the user ID of the tag registration data for which browsing has been requested, from the tag registration management data stored in the tag registration management data storage unit 115, and generates an image to be browsed as a list of image data in step S104. The image to be browsed as a list of image data is constituted by a tag ID and time information retrieved in association with a user ID, and a file name of image data registered as additional data in the tag registration data.

In step S105, the delivery information generation unit 113 controls the transmission controller 111b of the communication unit 111 to transmit the generated image to be browsed as a list of image data, serving as delivery information, to the portable terminal 11.

In step S65 (see FIG. 11), the browser management unit 57 controls a reception controller 72 of the communication control unit 56 to acquire, as data, the image to be browsed as a list of image data transmitted from the tag management server 12.

In step S66, the browser management unit 57 supplies the acquired data of the image to be browsed as a list of image data to the display control unit 51, and the data is displayed on the display unit 35, for example, as shown in FIG. 13.

Referring to FIG. 13, on the left of the figure, the dates and times at which tags were registered and images of the tags corresponding to tag IDs of the registered tags are displayed, and on the right of the figure, names of image data in which URIs of the image data corresponding to the registered tags are embedded are displayed.

That is, as is clear from FIG. 13, from the top of the figure, a tag indicating "fascinated" was registered on Aug. 31, 2007 at 09:18:05 and an image "20070831091805.jpg" was registered as additional data, a tag indicating "fascinated" was registered on Aug. 31, 2007 at 10:29:57 and an image "20070831102957.jpg" was registered as additional data, a tag indicating "delicious" was registered on Aug. 31, 2007 at 10:31:22 and an image "20070831103122.jpg" was registered as additional data, and a tag indicating "crying" was registered on Aug. 31, 2007 at 10:32:54 and an image "20070831103254.jpg" was registered as additional data. An image of each tag is based on a supplied tag ID.

In step S67, the browser management unit 57 determines whether or not the operation input unit 31 has been operated to select any one of the images. For example, in a case where it is determined in step S67 that the uppermost region in which the image "20070831091805.jpg" indicating image data is arranged has been designated and selected by a pointer or the like, the browser management unit 57 controls the transmission controller 71 of the communication control unit 56 to request, using the communication unit 34, the tag management server 12 to supply the tag registration data and the image data serving as additional data, on the basis of the tag ID, the user ID, and the time information stored in association with the selected image "20070831091805.jpg" in step S68.

In accordance with this, since it is determined in step S101 that browsing of tag registration data has not been requested, the delivery information generation unit 113 controls the reception controller 111a of the communication unit 111 to determine whether or not a request for tag registration data has been received in step S108. For example, in a case where it is determined in step S108 that a request for tag registration data and image data serving as additional data has been received by the processing of step S68, the delivery information generation unit 113 reads the requested tag registration data and image data serving as additional data from the tag registration management data storage unit 115 and the image data storage unit 114 in step S109.

In step S110, the tag registration management unit 112 controls the transmission controller 111b of the communication unit 111 to transmit the requested tag registration data and image data serving as additional data to the portable terminal 11.

In step S69, the browser management unit 57 controls the reception controller 72 of the communication control unit 56 to acquire, using the communication unit 34, the tag registration data and the image data serving as additional data transmitted from the tag management server 12.

Figure 14:
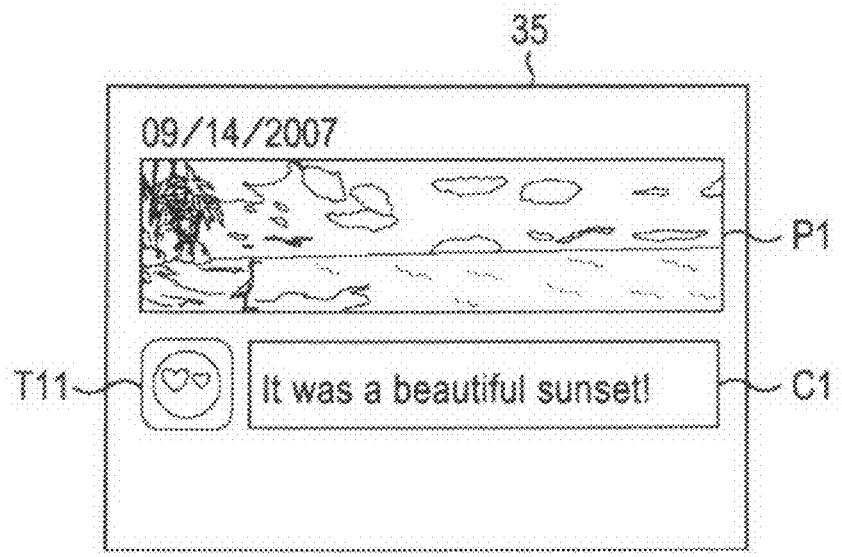
FIG. 14 illustrates the tag registration data browsing process.

In step S70, the browser management unit 57 supplies the acquired tag registration data and image data serving as additional data to the display control unit 51, and the tag registration data and the image data are displayed on the display unit 35, for example, as shown in FIG. 14.

Referring to FIG. 14, on the top of the figure, time information on the tag registration data of the selected image file "20070831091805.jpg" is displayed. Below the time information, an image P1 of the image file "20070831091805.jpg" is displayed. On the lower left of the figure, a tag T11 corresponding to "fascinated" is displayed. On the lower right of the figure, a comment field C1 in which a registered comment "It was a beautiful sunset!" is written is displayed.

As described above, by referring to image data registered together with a tag, the feeling of a person who registered the tag at the time of registration of the tag can be referred to. In a case where the person who refers to the image data is the same as the person who registered the image data and the tag, the person is able to maintain the feeling as a record and repeatedly recall the feeling. In addition, irrespective of whether or not the person who refers to the image data is the same as the person who registered the image data and the tag, since information on the tag can be supplied, a feeling experienced at a certain time can be shared among many people including the person who registered the image data and the tag. Furthermore, since image data can be displayed, the scene that gave the user the feeling at that time can be recorded and the scene can be shared with other people.

In step S71, the tag reading unit 52 determines whether or not the operation input unit 31 has been operated to select response tag registration data from among the images shown in FIG. 7. For example, in a case where another person browses the image shown in FIG. 14 and selects the tag T4 indicating "surprised" shown in FIG. 7, a tag registration data generation process is performed in step S72. Note that since the tag registration data generation process is similar to the process described above with reference to FIG. 4, the explanation of the tag registration data generation process will be omitted.

In step S73, the browser management unit 57 reads the tag registration data newly registered for response in the storage unit 32, and controls the transmission controller 71 of the communication control unit 56 to transmit the read tag registration data to the tag management server 12.

In step S111 (see FIG. 12), the tag registration management unit 112 accesses the tag registration management data storage unit 115 to increment the number of accesses of the read tag registration data by one.

In step S112, the tag registration management unit 112 determines whether or not tag registration data registered for response has been transmitted. For example, in a case where response tag registration data has been transmitted by the processing of step S73, the tag registration management unit 112 performs updating by entering the transmitted tag registration data in a response tag registration data field of the read tag registration management data in step S113.

Figure 15:
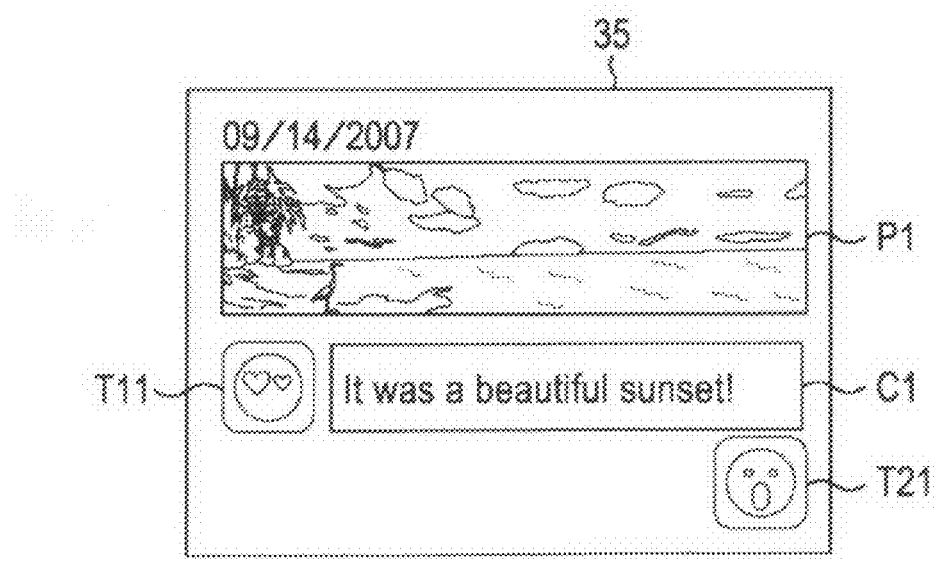
FIG. 15 illustrates the tag registration data browsing process.

Thus, after the response tag registration data is registered, when an image is selected by the processing of step S67, for example, a tag T21 indicating "surprised", which is a response tag, is displayed on the lower right, as shown in FIG. 15. As described above, a feeling experienced by referring to the image data registered for the tag can be further registered as a tag, feelings for the image data added as additional data to the tag registration data can be shared among many people. In addition, a difference between own and other's feelings can be recognized.

In a case where it is determined in step S67 that no image has been selected, the processing of steps S68 to S73 is skipped. In addition, in a case where it is determined in step S71 that response tag registration data has not been selected, the processing of steps S72 and S73 is skipped. Then, in step S74, the browser management unit 57 determines whether or not termination of browsing has been instructed. In a case where it is determined in step S74 that termination of browsing has not been instructed, the process returns to step S67. That is, in a case where no image of a displayed list of image data has been selected, the processing of steps S67 and S74 is repeated until termination of browsing has been instructed. In a case where it is determined in step S74 that termination of browsing has been instructed, the process returns to step S61.

In a case where it is determined in step S112 that no response tag registration data has been registered by the processing of step S71, the processing of step S73 is skipped, and the processing of step S113 is thus skipped. Then, the process returns to step S101.

In a case where it is determined in step S63 that browsing of a list of image data has not been instructed, the browser management unit 57 determines whether or not browsing of a list of positional information has been instructed in step S75. For example, in a case where the operation input unit 31 has been operated to issue an instruction for browsing of a list of positional information and to enter the URL or the like of the corresponding tag management server 12, the browser management unit 57 controls the transmission controller 71 of the communication control unit 56 to request, from the communication unit 34 via the Internet 13, the tag management server 12 for browsing of a list of positional information registered as additional data from the tag registration data, on the basis of the corresponding URL, in step S76.

Then, since it is determined in step S103 (see FIG. 12) that browsing of image data has not been requested, it is determined that a list of positional information has been requested. Then, in step S106, the delivery information generation unit 113 reads, from the tag registration management data storage unit 115, positional information registered as additional data in association with the user ID of the tag registration data for which browsing has been requested, from the tag registration management data stored in the tag registration management data storage unit 115, and generates an image to be browsed as a list of positional information as delivery information in step S106. Here, the delivery information generation unit 113 reads map data from the map data storage unit 116, performs mapping of a tag image on the basis of the positional information, and generates an image to be browsed as a list of positional information as well as the map data. Specifically, the image to be browsed as a list of positional information includes a list constituted by a tag ID and time information retrieved in association with a user ID, positional information registered as additional data in the tag registration data, and a map image in which an image of the tag is mapped on a map in association with the positional information.

In step S107, the delivery information generation unit 113 controls the transmission controller 111b of the communication unit 111 to transmit the generated image to be browsed as a list of positional information to the portable terminal 11.

In step S77 (see FIG. 11), the browser management unit 57 controls the reception controller 72 of the communication control unit 56 to acquire, as data, the image to be browsed as a list of positional information transmitted from the tag management server 12.

Figure 16:
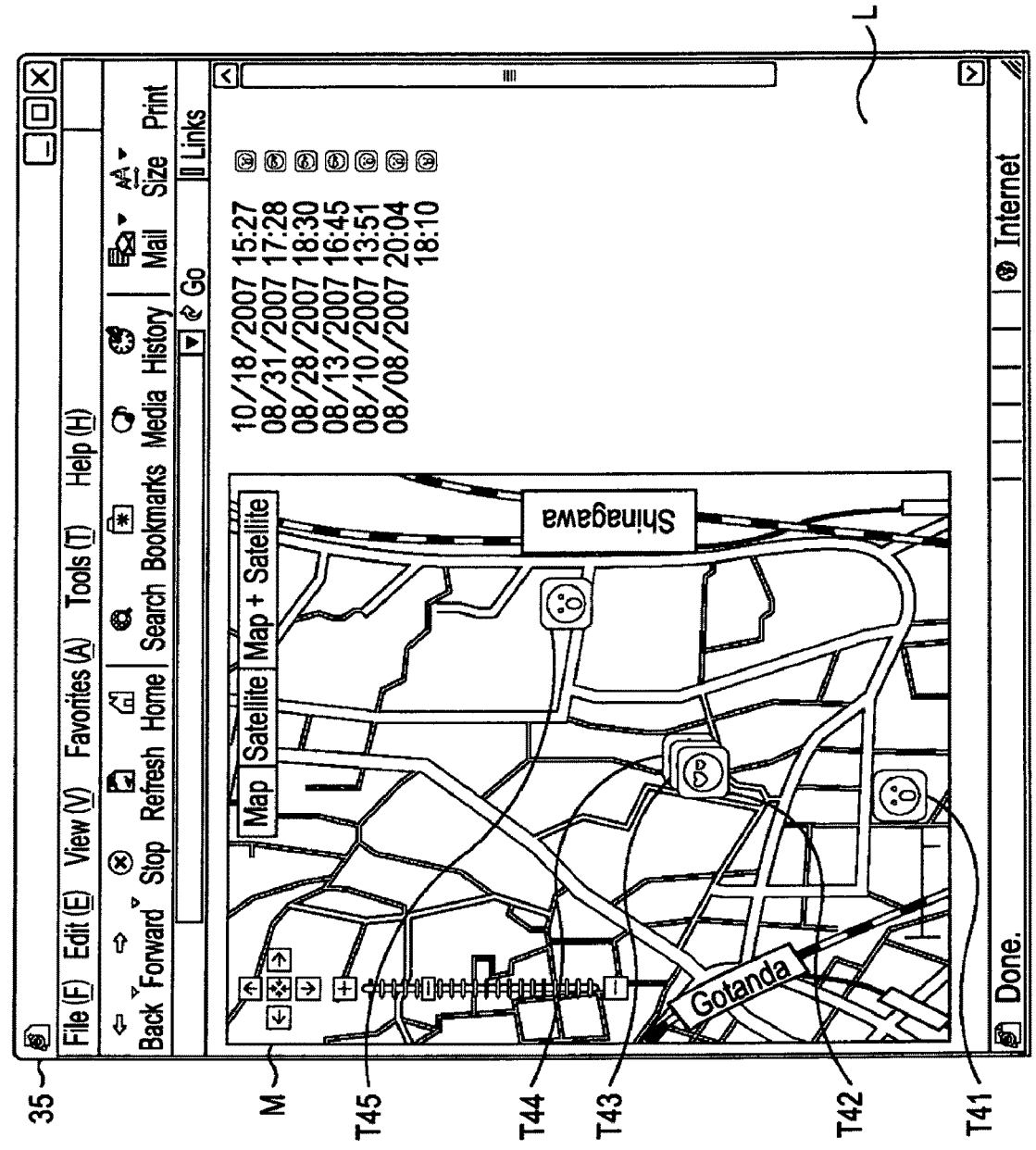
FIG. 16 illustrates the tag registration data browsing process.

In step S78, the browser management unit 57 supplies the acquired data of the image to be browsed as a list of positional information to the display control unit 51, and the data is displayed on the display unit 35, for example, as shown in FIG. 16.

Referring to FIG. 16, a map display field M is displayed on the left of the figure, and a tag list display field L is displayed on the right of the figure. In the tag list display field L, the date and times at which tags were registered and the tags corresponding to tag IDs of the registered tags are displayed.

That is, as is clear from the tag list display field L shown in FIG. 16, from the top of the figure, a tag indicating "surprised" was registered on Oct. 18, 2007 at 15:27, a tag indicating "fascinated" was registered on Aug. 31, 2007 at 17:28, a tag indicating "fascinated" was registered on Aug. 28, 2007 at 18:30, a tag indicating "fascinated" was registered on Aug. 13, 2007 at 16:45, a tag indicating "surprised" was registered on Aug. 10, 2007 at 13:51, a tag indicating "surprised" was registered on Aug. 8, 2007 at 20:04, and a tag indicating "surprised" was registered on Aug. 8, 2007 at 18:10. An image of each tag is based on a supplied tag ID.

In addition, in the map display field M, on the basis of positional information corresponding to the tag registration data recorded in the tag list display field L, an image of the tag is displayed on a map. Referring to FIG. 16, a tag T41 indicating "surprised", a tag T42 indicating "fascinated", a tag T43 indicating "fascinated", a tag T44 indicating "fascinated", and a tag T45 indicating "surprised" are displayed. The tags T41 to T45 on the map display field M can be selected by a pointer or the like (not illustrated).

In step S79, the browser management unit 57 determines whether or not the operation input unit 31 has been operated to select any one of the tags. For example, in a case where it is determined in step S79 that the tag T42 in the map display field M has been designated and selected by a pointer or the like, the browser management unit 57 controls the transmission controller 71 of the communication control unit 56 to request, using the communication unit 34, the tag management server 12 to supply the tag registration data and the additional data on the basis of the tag ID, the user ID, and the time information stored in association with the selected tag T42 in step S80.

In accordance with this, for example, in a case where it is determined in step S108 (see FIG. 12) that tag registration data has been requested by the processing of step S80, the delivery information generation unit 113 reads the requested tag registration data and image data serving as additional data from the tag registration management data storage unit 115 and the image data storage unit 114 in step S109.

In step S110, the delivery information generation unit 113 controls the transmission controller 111b of the communication unit 111 to transmit the requested tag registration data and image data serving as additional data to the portable terminal 11.

In step S82 (see FIG. 11), the browser management unit 57 controls the reception controller 72 of the communication control unit 56 to acquire, using the communication unit 34, the tag registration data and the image data serving as additional data transmitted from the tag management server 12.

In step S83, the browser management unit 57 supplies the acquired tag registration data and image data serving as additional data to the display control unit 51, and the tag registration data and the image data are displayed on the display unit 35, for example, as shown in FIG. 14 or FIG. 16.

In step S83, the tag reading unit 52 determines whether or not the operation input unit 31 has been operated to select response tag registration data from among the images shown in FIG. 7. For example, in a case where any one of the tags shown in FIG. 7 has been selected, a tag registration data generation process is performed in step S84. Note that since the tag registration data generation process is similar to the process described above with reference to FIG. 4, the explanation of the tag registration data generation process will be omitted.

In step S85, the browser management unit 57 reads the tag registration data newly registered for response in the storage unit 32, and controls the transmission controller 71 of the communication control unit 56 to transmit the read tag registration data to the tag management server 12.

In step S111 (see FIG. 12), the tag registration management unit 112 accesses the tag registration management data storage unit 115 to increment the number of accesses of the read tag registration data by one.

In step S112, the tag registration management unit 112 determines whether or not tag registration data registered for response has been transmitted. For example, in a case where response tag registration data has been transmitted by the processing of step S73, the tag registration management unit 112 performs updating by entering the transmitted tag registration data in the response tag registration data field of the read tag registration management data in step S113.

In a case where it is determined in step S79 (see FIG. 11) that no tag has been selected, the processing of steps S80 to S85 is skipped. In addition, in a case where it is determined in step S83 that response tag registration data has not been selected, the processing of steps S84 and S85 is skipped. Then, in step S86, the browser management unit 57 determines whether or not termination of browsing has been instructed. In a case where it is determined in step S86 that termination of browsing has not been instructed, the process returns to step S79. That is, in a case where no tag of a displayed list of positional information has been selected, the processing of steps S79 and S86 is repeated until termination of browsing has been instructed. In a case where it is determined in step S86 that termination of browsing has been instructed, the process returns to step S61.

In a case where it is determined in step S112 that no response tag registration data has been registered by the processing of step S83, the processing of step S84 is skipped, and the processing of step S113 is thus skipped. Then, the process returns to step S101.

By referring to positional information registered together with a tag in the process described above, the feeling of a person who registered the tag at the position of registration of the tag can be referred to. In a case where the person who refers to the positional information is the same as the person who registered the positional information and the tag, the person is able to maintain the feeling as a record and repeatedly recall the feeling. In addition, irrespective of whether or not the person who refers to the positional information is the same as the person who registered the positional information and the tag, since information on the tag can be supplied, a feeling experienced at a certain place can be shared among many people including the person who registered the positional information and the tag. In addition, for example, a feeling that is more likely to be experienced at a certain place can be understood.

The above-described series of information processes can be performed by hardware or software. In a case where the series of processes is performed by software, a program constituting the software is installed from a recording medium into a computer built in dedicated hardware or, for example, a general-purpose personal computer capable of performing various functions by various programs being installed thereon.

FIG. 17 shows an example of the configuration of a general-purpose personal computer. The personal computer contains a CPU 1001. An input/output interface 1005 is connected through a bus 1004 to the CPU 1001. A read-only memory (ROM) 1002 and a random-access memory (RAM) 1003 are connected to the bus 1004.

An input unit 1006 constituted by an input device, such as a keyboard and a mouse, used by a user to enter an operation command, an output unit 1007 for outputting a processing operation screen and an image of a processing result to a display device, a storage unit 1008 constituted by a hard disk drive in which programs and various data are stored, and a communication unit 1009 including a local-area network (LAN) adapter or the like and performing communication processing through a network typified by the Internet are connected to the input/output interface 1005. In addition, a drive 1010 for reading and writing data from and to a removable medium 1011, such as a magnetic disk (including a flexible disk), an optical disk (including a compact disc read-only memory (CD-ROM) or a digital versatile disc (DVD)), a magneto-optical disk (MD (Mini Disc)), or a semiconductor memory, is also connected to the input/output interface 1005.

The CPU 1001 performs various processing operations in accordance with a program stored in the ROM 1002 or a program read from the removable medium 1011, such as a magnetic disk, an optical disk, a magneto-optical disk, or a semiconductor memory, installed to the storage unit 1008, and loaded from the storage unit 1008 to the RAM 1003. In the RAM 1003, data necessary for the CPU 1001 to perform various processing operations is also stored, where necessary.

Note that in this description, steps describing a program recorded in a recording medium include not only processing operations performed in time series in accordance with the written order but also processing operations performed in parallel or independently, the processing operations being not necessarily performed in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   identification information acquisition means for acquiring identification information that is contained in a tag whose registration has been instructed by a user and that identifies the tag from among a plurality of tags indicating user feelings;
   registration information generation means for acquiring information corresponding to a user feeling indicated by the tag whose registration has been instructed by the user and for generating registration information including the information corresponding to the user feeling added in association with the identification information; and
   display means for displaying a list of images of tags corresponding to identification information contained in the registration information and displaying information corresponding to a user feeling added in association with identification information corresponding to a tag selected from the list of the images of the tags, on the basis of the registration information generated by the registration information generation means,
   wherein when displaying information corresponding to a user feeling added in association with identification information corresponding to a tag selected from the list of the images of the tags, also displayed are an icon corresponding to the selected tag and an icon corresponding to a tag registered in response to the selected tag.

2. The information processing apparatus according to claim 1, wherein the information corresponding to the user feeling is a uniform resource identifier in which corresponding information is stored.

3. The information processing apparatus according to claim 1, further comprising:
   image capturing means for capturing an image,
   wherein the registration information generation means acquires the image captured by the image capturing means as the information corresponding to the user feeling indicated by the tag whose registration has been instructed by the user, and generates registration information including the information corresponding to the user feeling added in association with the identification information.

4. The information processing apparatus according to claim 1, further comprising:
   positional information acquisition means for acquiring positional information,
   wherein the registration information generation means acquires the positional information acquired by the positional information acquisition means as the information corresponding to the user feeling indicated by the tag whose registration has been instructed by the user, and generates registration information including the information corresponding to the user feeling added in association with the identification information.

5. The information processing apparatus according to claim 1, further comprising:
   input means for entering text information,
   wherein the registration information generation means acquires the text information entered by the input means as the information corresponding to the user feeling indicated by the tag whose registration has been instructed by the user, and generates registration information including the information corresponding to the user feeling added in association with the identification information.

6. The information processing apparatus according to claim 1, further comprising:
   transmission means for transmitting information to an external apparatus;
   reception means for receiving the information from the external apparatus; and
   selection means for selecting a tag from the list of the images of the tags,
   wherein the transmission means transmits the registration information to the external apparatus,
   wherein the reception means receives, from the external apparatus, the list of the images of the tags corresponding to the identification information contained in the registration information, on the basis of the registration information,
   wherein the transmission means requests the external apparatus to supply the information corresponding to the user feeling added in association with the identification information corresponding to the tag selected by the selection means,
   wherein the reception means receives the information corresponding to the user feeling transmitted from the external apparatus, in response to the request, and
   wherein the display means displays the information corresponding to the user feeling received by the reception means.

7. An information processing method comprising the steps of:
   acquiring identification information that is contained in a tag whose registration has been instructed by a user and that identifies the tag from among a plurality of tags indicating user feelings;
   acquiring information corresponding to a user feeling indicated by the tag whose registration has been instructed by the user, and generating registration information including the information corresponding to the user feeling added in association with the identification information; and
   displaying a list of images of tags corresponding to identification information contained in the registration information and displaying information corresponding to a user feeling added in association with identification information corresponding to a tag selected from the list of the images of the tags, on the basis of the generated registration information,
   wherein when displaying information corresponding to a user feeling added in association with identification information corresponding to a tag selected from the list of the images of the tags, also displayed are an icon corresponding to the selected tag and an icon corresponding to a tag registered in response to the selected tag.

8. A program for causing a computer to execute processing comprising the steps of:
   acquiring identification information that is contained in a tag whose registration has been instructed by a user and that identifies the tag from among a plurality of tags indicating user feelings;
   acquiring information corresponding to a user feeling indicated by the tag whose registration has been instructed by the user, and generating registration information including the information corresponding to the user feeling added in association with the identification information; and
   displaying a list of images of tags corresponding to identification information contained in the registration information and displaying information corresponding to a user feeling added in association with identification information corresponding to a tag selected from the list of the images of the tags, on the basis of the generated registration information,
   wherein when displaying information corresponding to a user feeling added in association with identification information corresponding to a tag selected from the list of the images of the tags, also displayed are an icon corresponding to the selected tag and an icon corresponding to a tag registered in response to the selected tag.

9. An information processing apparatus comprising:
   an identification information acquisition unit configured to acquire identification information that is contained in a tag whose registration has been instructed by a user and that identifies the tag from among a plurality of tags indicating user feelings;
   a registration information generation unit configured to acquire information corresponding to a user feeling indicated by the tag whose registration has been instructed by the user and to generate registration information including the information corresponding to the user feeling added in association with the identification information; and
   a display unit configured to display a list of images of tags corresponding to identification information contained in the registration information and display information corresponding to a user feeling added in association with identification information corresponding to a tag selected from the list of the images of the tags, on the basis of the registration information generated by the registration information generation unit,
   wherein when displaying information corresponding to a user feeling added in association with identification information corresponding to a tag selected from the list of the images of the tags, also displayed are an icon corresponding to the selected tag and an icon corresponding to a tag registered in response to the selected tag.

* * * * *